P. C. ROWE.
Velocipede.
No. 90,585.　　　　　　　　　　　　　Patented May 25, 1869.
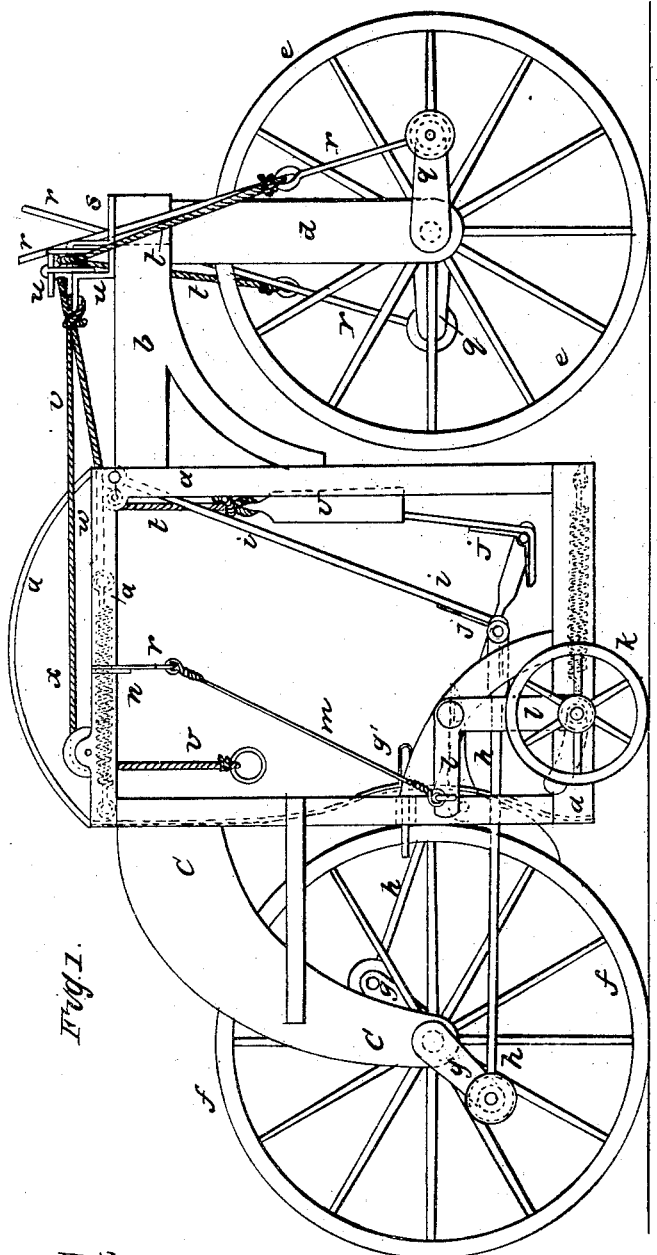
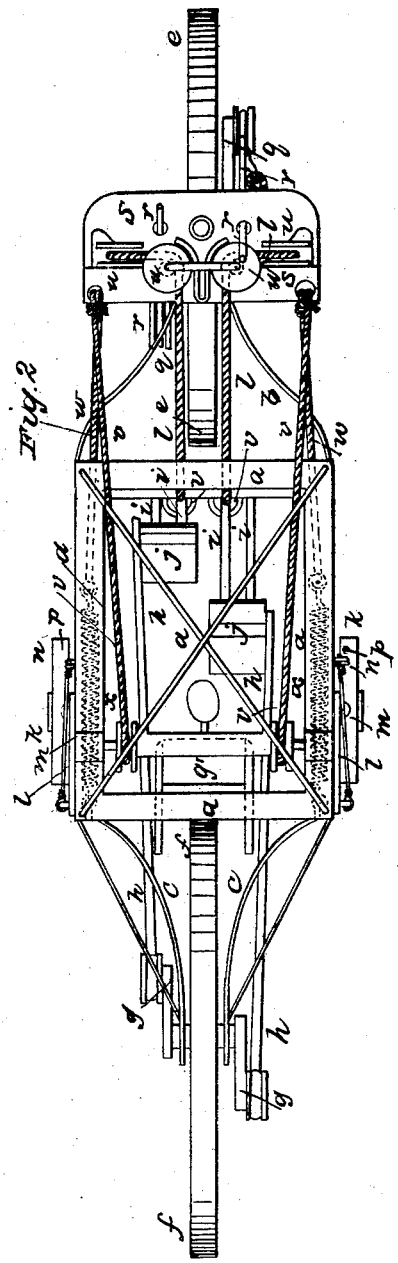

United States Patent Office.

PHILIP C. ROWE, OF BOSTON, MASSACHUSETTS.

Letters Patent No. 90,585, dated May 25, 1869.

IMPROVEMENT IN VELOCIPEDES.

The Schedule referred to in these Letters Patent and making part of the same.

*To all whom it may concern:*

Be it known that I, PHILIP C. ROWE, of Boston, in the county of Suffolk, and State of Massachusetts, have invented Improvements in Velocipedes; and I do hereby declare that the following, taken in connection with the drawings which accompany and form part of this specification, is a description of my invention, sufficient to enable those skilled in the art to practise it.

This invention consists—

First, in such an arrangement and combination of the parts of a velocipede as brings the centre of gravity of the vehicle and the rider very near the ground, thus lessening liability to overturn, and the seriousness of the accident when it occurs.

Second, in the combination, with two large wheels, which are located in the central longitudinal vertical plane of the vehicle, and to one or both of which muscular effort is applied to move the vehicle, of two small wheels, rolls, or casters attached, one on each side of the vehicle, so that by manipulation of the rider they can be made to touch the ground, to steady the vehicle when in motion or when still.

Third, in combining, with the steering-wheel lever, two equal springs under tension, so as always to return the steering-wheel to the same plane with the following or trailing-wheel, and to hold the steering-wheel in said plane, causing the vehicle to run in a straight line, except when said wheel is purposely deflected by the rider, or is for a moment and accidentally deflected by an obstruction.

Fourth, in the arrangement and combination, with a leading and trailing-wheel, both in the central longitudinal vertical plane of the vehicle, of two cranks on each wheel, when the cranks of each pair are arranged substantially at angles of one hundred and eighty degrees to each other, and so that one pair of cranks may be worked by the feet, and the other pair by the hands of the rider.

Fifth, in operating the cranks on the steering-wheel by means of flexible connections, which are so brought, by means of leading-rolls, to or toward the steering-axis of the wheel, that the power exerted on the cranks to propel the vehicle, exerts no material strain in deflecting the wheel.

The drawings show, in sectional side elevation, Figure 1, a velocipede, embodying my invention, the same being also shown in plan in Figure 2.

The body of the vehicle is intended preferably to be made as a light frame-work, *a*, of metal, which may be covered to any desirable extent to shield the occupant from the sun and rain.

At the front and rear, strong brackets, *b* and *c*, are fixed to the frame-work, and project therefrom, the bracket *b* having in its end a vertical bearing, in which is pivoted the shaft of the fork *d*, in the lower ends of which are formed the bearings for the axle of the front or steering-wheel *e*.

The rear bracket *c* is bifurcated and strongly braced, as is also the front bracket, the bracket *c* having, in the ends of its fork, bearings for the axle of the hind wheel *f*.

The body of the vehicle is intended to be at least of such a size as accommodates one person seated on the seat $g'$, giving room for full extension of the legs toward the front wheel, so that by contraction and extension of the legs of the rider, the hind wheel will be rotated through the combination of the cranks *g* of the wheel *f*, the connecting-rods or links *h*, and suspensories *i*, pivoted at the front of the top of the frame *a*, whenever the feet are placed against and on the pedals at *j*.

Both the wheels *e* and *f* are intended to be large, and the bottom of the body of the vehicle is designed to be brought as near the ground as will allow it to pass over any ordinary projection likely to be found on a roadway.

The casters, or rolls, or small wheels *k*, are journalled on studs, each of which is fixed to one end of a bent lever, *l*, pivoted to the side of the body of the vehicle, while the other end of each bent lever is provided with a connector by which the wheel on the lever can be raised from contact with the ground, and so held by confining the connector *m* to a hook, *n*.

The arms of levers *l*, to which the wheels *k* are journalled, have springs *o* attached thereto, and to the body of the vehicle under strain, so as to bring the wheels *k* to the ground when connectors *m* are released from the hooks *n*, when they are connected to the hooks *p* to keep them out of the way.

To the cranks *q* on the steering-wheel are connected rods *r*, which work through guide-holes in the steering-lever *s*, fixed on the shaft of the fork *d*.

Lines, or chains, or other suitable connections *t*, are secured to the rods *r*, near the crank-pins, and are passed over the leading rolls *u* into the body of the vehicle, where, with weights $v'$ attached, they hang within reach of the rider, so that he can seize them with each hand, and exert the muscular force of the arms and upper part of the body upon the cranks *q* to turn wheel *e*.

The lines *t*, being brought to or near the centre of the vertical shaft of the fork *d*, prevent strain upon them from deflecting the wheel *e*, which would be deflected, first to one side, and then to the other, if the strain were exerted in the planes of rotation of the cranks *q*.

The lines *v* are attached to the ends of the steering-lever *s*, and are led into the body of the vehicle within reach of the occupant, who, by seizing and pulling upon one or the other of them, can turn the vehicle, when in motion, to either side.

To keep the steering-wheel in its normal position in the vertical longitudinal central plane of the vehicle, the ends of the steering-lever *s* are connected by lines $w$ to springs $x$, which are under considerable and equal tension, and act to return the wheel $e$ to its normal position when deflected by obstructions, and when the steering-lines $v$ are released by the rider. A brake may be conveniently applied to the hind wheel, and the seat may be made adjustable to suit persons of various lengths of limbs.

I claim—

1. A velocipede, made with a body reaching nearly to the ground and pendent between two supporting-wheels, one of which is arranged to be turned either to the right or left when provided with steadying-wheels on either side of the body, made adjustable as to position, and operating substantially as described.

2. Also, the combination of the springs $x$ with the steering-wheel, when arranged to operate substantially as described.

3. Also, the combination, in one vehicle, of a central leading and a central trailing-wheel, when one is arranged as a steering-wheel, and when each wheel is provided with a pair of cranks, and each crank of each pair is arranged at an angle of about one hundred and eighty degrees with reference to its fellow, and one pair is provided with means for being operated by the feet, and the other pair by the hands of the rider.

4. Also, the combination, with the steering-wheel, of flexible connections, and leaders therefor, arranged substantially as and for the purpose set forth.

P. C. ROWE.

Witnesses:
    J. B. CROSBY,
    S. B. KIDDER.